(12) United States Patent
Rajagopalan et al.

(10) Patent No.: US 10,007,714 B2
(45) Date of Patent: Jun. 26, 2018

(54) ONGOING MANAGEMENT FOR PRE-PLANNED HANDLING OF DIGITAL PRESENCE

(71) Applicant: Microsoft Technology Licensing, LLC, Redmond, WA (US)

(72) Inventors: Rajmohan Rajagopalan, Sammamish, WA (US); Michael Stokes, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 408 days.

(21) Appl. No.: 14/722,250

(22) Filed: May 27, 2015

(65) Prior Publication Data
US 2016/0259835 A1 Sep. 8, 2016

Related U.S. Application Data

(60) Provisional application No. 62/128,883, filed on Mar. 5, 2015.

(51) Int. Cl.
*G06F 17/30* (2006.01)
*H04L 29/08* (2006.01)
(Continued)

(52) U.S. Cl.
CPC .. *G06F 17/30575* (2013.01); *G06F 17/30144* (2013.01); *G06F 17/30598* (2013.01);
(Continued)

(58) Field of Classification Search
CPC ......... G06F 17/30598; G06F 17/30864; G06F 17/30011; G06F 17/30144; G06F 17/30368; G06F 17/30867
(Continued)

(56) References Cited

U.S. PATENT DOCUMENTS 7,716,732 B2   5/2010 Dodson et al.
8,396,838 B2 * 3/2013 Brockway ......... G06F 17/30616
                                                                707/662
(Continued)

FOREIGN PATENT DOCUMENTS

WO   2005119992 A1   12/2005
WO   2013170374 A1   11/2013

OTHER PUBLICATIONS

"International Search Report and Written Opinion Issued in PCT Application No. PCT/US2016/020305", dated May 20, 2016, 12 Pages.
(Continued)

*Primary Examiner* — Dangelino N Gortayo
(74) *Attorney, Agent, or Firm* — Turk IP Law, LLC

(57) ABSTRACT

Ongoing management for pre-planned handling of digital presence is provided. A service such as a management service monitors continuously monitors digital assets of an asset owner hosted at external resources. A change to the digital assets retrieved from the external resources is analyzed in response to a detection of the change. The change is processed to reclassify the digital assets into asset categories. The digital assets and the asset categories are matched to suggested actions and suggested trigger events. The suggested actions include operations to dispose of the digital assets in case of an incapacitation of the asset owner. A notification is transmitted to an asset manager to prompt the asset manager to review the updates to the digital assets, the asset categories, the suggested actions, and the suggested trigger events.

20 Claims, 7 Drawing Sheets

(51) Int. Cl.
*G06Q 10/10* (2012.01)
*G06Q 50/00* (2012.01)

(52) U.S. Cl.
CPC ............ *G06Q 10/10* (2013.01); *G06Q 50/01* (2013.01); *H04L 67/1095* (2013.01); *G06F 17/30082* (2013.01); *G06F 17/30368* (2013.01)

(58) Field of Classification Search
USPC ....... 707/634, 627, 662, 665, 690, 694, 751, 707/783
See application file for complete search history.

(56) References Cited

U.S. PATENT DOCUMENTS

| | | | | |
|---|---|---|---|---|
| 8,538,966 | B2* | 9/2013 | Reese | G06F 3/0481 707/737 |
| 9,286,316 | B2* | 3/2016 | Faitelson | H04L 67/1004 |
| 9,298,927 | B2* | 3/2016 | Lietz | G06F 21/577 |
| 9,584,314 | B2* | 2/2017 | Bajekal | H04L 9/0816 |
| 2002/0111946 | A1* | 8/2002 | Fallon | G06Q 10/10 |
| 2010/0180349 | A1* | 7/2010 | Koohgoli | G06F 21/10 726/30 |
| 2012/0016803 | A1 | 1/2012 | Tharp | |
| 2013/0031176 | A1 | 1/2013 | Shih et al. | |
| 2013/0054780 | A1 | 2/2013 | Bade et al. | |
| 2013/0144960 | A1 | 6/2013 | Salamat | |
| 2013/0325976 | A1 | 12/2013 | Mansfield et al. | |
| 2014/0025591 | A1 | 1/2014 | Villa, III | |
| 2014/0136591 | A1 | 5/2014 | Hoberman | |
| 2014/0136619 | A1 | 5/2014 | Hoberman | |
| 2014/0143106 | A1 | 5/2014 | Fox | |
| 2014/0181928 | A1 | 6/2014 | Bergman et al. | |
| 2015/0304343 | A1* | 10/2015 | Cabrera | H04L 63/14 726/23 |
| 2016/0125068 | A1* | 5/2016 | Dongieux | G06Q 10/0633 707/740 |

OTHER PUBLICATIONS

Desmarais, Christina., "Manage What Happens to Your Online Accounts After You Die", Published on: Aug. 25, 2014 Available at: http://www.techlicious.com/how-to/how-to-manage-your-online-accounts-after-you-die/.
"Legacy Locker", Published on: Feb. 14, 2014 Available at: https://www.passwordbox.com/legacylocker.
Swallow, Erica., "7 Resources for Handling Digital Life after Death", Published on: Oct. 11, 2010 Available at: http://mashable.com/2010/10/11/social-media-after-death/.
Rosen, Rebecca J., "Google Death: A Tool to Take Care of Your Gmail When You're Gone", Published on: Apr. 12, 2013 Available at: http://www.theatlantic.com/technology/archive/2013/04/google-death-a-tool-to-take-care-of-your-gmail-when-youre-gone/274934/.
"Handling Your Digital Presence after Death", Retrieved on: Apr. 17, 2015 Available at: http://www.jardinefuneralhome.com/mysendoff/story/handling-your-digital-presence-after-death.
"The Deathswitch", Retrieved on: Apr. 17, 2015 Available at: https://deathswitch.com/.
Callison-Burch, et al., "Adding a Legacy Contact", Published on: Feb. 12, 2015 Available at: https://newsroom.fb.com/news/2015/02/adding-a-legacy-contact/.
"International Preliminary Report on Patentability Issued in PCT Application No. PCT/US2016/020305", dated May 24, 2017, 8 Pages.
"Second Written Opinion Received for PCT Application No. PCT/US2016/020305", dated Jan. 31, 2017, 7 Pages.

* cited by examiner

ONGOING MANAGEMENT FOR PRE-PLANNED HANDLING OF DIGITAL PRESENCE

CROSS-REFERENCE TO RELATED APPLICATION

This application claims priority under 35 U.S.C. § 119(e) to U.S. Provisional Patent Application Ser. No. 62/128,883 filed on Mar. 5, 2015. The disclosure of the U.S. Provisional Patent Application is hereby incorporated by reference in its entirety.

BACKGROUND

The proliferation of computerized automation of processes in every aspect of life, data storage and processing have become a major component of networked systems handling social interactions. In such systems, social data is entered, modified, or deleted from a number of sources. Various social data stores from simple tables to complicated databases are maintained and synchronized as new entries or modifications are made by different sources. In addition, variety of services are offered to enable internal and external parties' interactivity with the social data hosted by the data stores. Incapacitation events associated with an owner of the social data present significant challenges in management and disposition of the social data.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to ongoing management for pre-planned handling of digital presence based on events. In some example embodiments, a management service may monitor digital assets of an asset owner hosted at external resources. The management service may analyze a change to the digital assets retrieved from the external resources in response to a detection of the change. The change may be processed to reclassify the digital assets into asset categories. The digital assets and the asset categories may be matched to suggested actions and suggested trigger events. A notification may be transmitted to the asset manager to prompt the asset manager to review updates to the digital assets, the asset categories, the suggested action, and the suggested trigger events.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
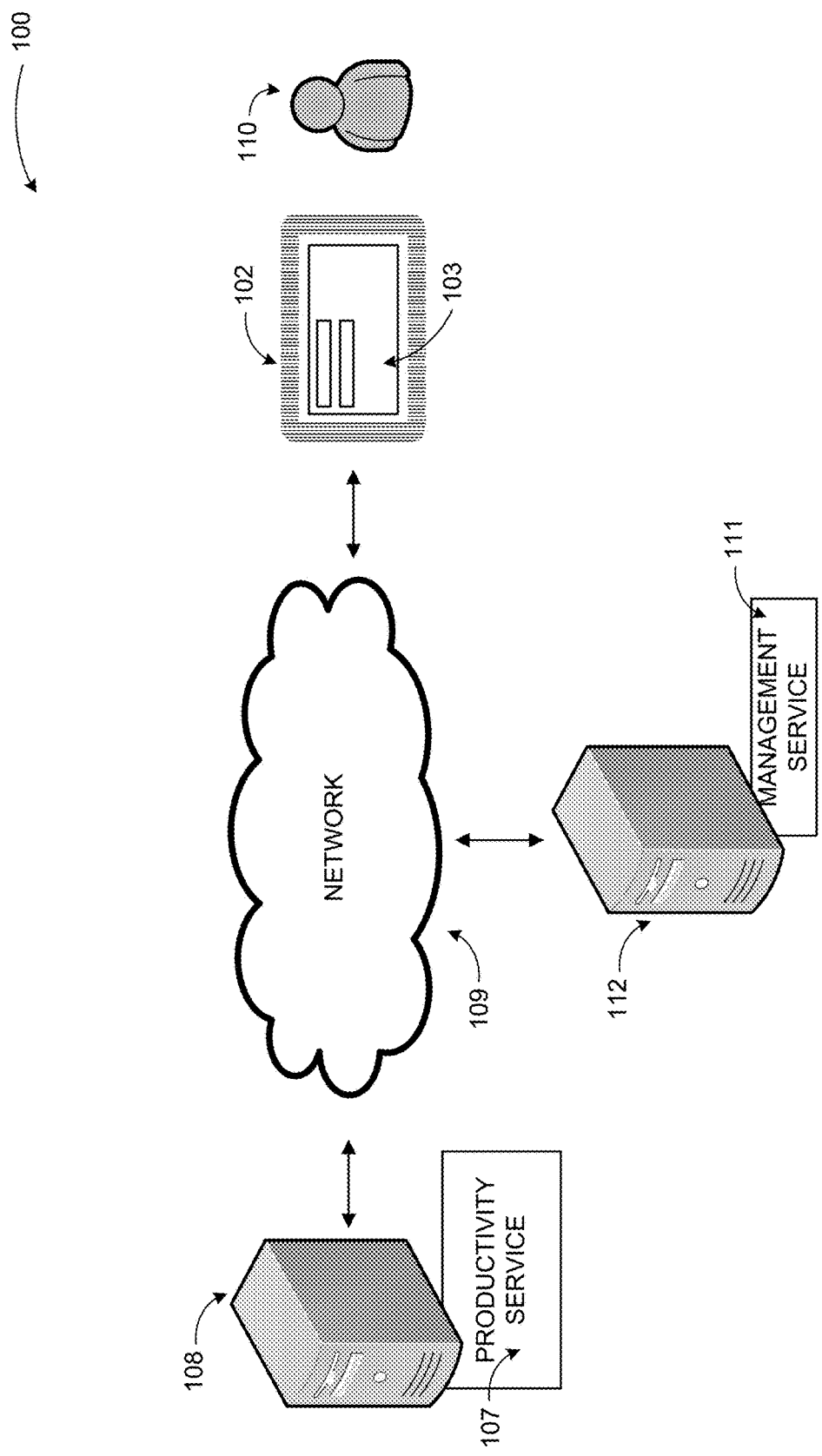
FIG. 1 is a conceptual diagram illustrating an example of ongoing management for pre-planned handling of digital presence, according to embodiments.

As briefly described above, ongoing management for pre-planned handling of digital presence may be provided by a management service. Digital assets of an asset owner hosted at external resources may be continuously monitored by the management service. A change to the digital assets retrieved from the external resources may be analyzed in response to a detection of the change at the external resources. The change may be processed to reclassify the digital assets into asset categories. The digital assets and the asset categories may be matched to suggested actions and suggested trigger events. A notification may be transmitted to an asset manager to prompt the asset manager to review the digital assets, the asset categories, the suggested actions, and the suggested trigger events.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid-state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provide ongoing management for pre-planned handling of digital presence. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating an example of ongoing management for pre-planned handling of digital presence, according to embodiments.

In a diagram 100, a computing device 112 may execute a management service 111. An example of the management service 111 may include an application that provides information and data processing functionality. The computing device 112 may include a hardware based server, a laptop computer, and a desktop computer, among others.

The computing device 112 may communicate with an external resource 108 and a client device 102 through a network 109. The external resource 108 may provide a productivity service 107. Examples of the productivity service 107 may include a communication service, a social networking service, a professional networking service, an application service, and a storage service, among others. The application service may provide applications for use and consumption by client devices.

The network 109 may include wired and wireless components that allow wired and wireless communication between nodes such as the external resource 108, the computing device 112, and the client device 102, among others. The client device 102 may display a client user interface (UI) 103 of the management service 111 to an asset manager 110. The client UI 103 may provide functionality to manage digital assets that form a digital presence.

A detected change to digital assets may be processed to update components of a workflow. The workflow includes suggested actions to dispose of the digital assets of the asset owner in case of a trigger event such as an incapacitation of the asset owner. An example of suggested actions may include transfer of the digital assets of the asset owner to a legal representative, among others. Updates to digital assets, asset categories, suggested actions, and suggested trigger events may be presented to the asset manager 110 through the client UI 103. The asset manager 110 may customize the presented updates.

The asset manager 110 may be allowed to interact with the client UI 103 through an input device or touch enabled display component of the client device 102. The client device 102 may include a display device such as the touch enabled display component, and a monitor, among others. The display device may be used to provide the client UI 103 of the management service 111 to the asset manager 110.

The asset manager 110 may interact with the client UI 103 with a keyboard based input, a mouse based input, a voice based input, a pen based input, and a gesture based input, among others. The gesture based input may include one or more touch based actions such as a touch action, a swipe action, and a combination of each, among others.

The management service 111 may use credentials of an asset owner to retrieve digital assets of an asset owner from the productivity service 107. A search of the digital assets may be conducted at the productivity service 107. Identified digital assets may be retrieved from the productivity service 107. Digital assets such as pictures, documents, and accounts (such as account status information), among others may be retrieved. A workflow of suggested actions, suggested triggers, the digital assets, and classifications of the digital assets in asset categories may be created to dispose of the digital assets in case of a trigger event.

A detected change may be used to process the digital assets to new or existing asset categories. The updated digital assets and the asset categories may be matched to suggested actions and suggested triggers. A notification may be transmitted to the asset manager to review the updated digital assets, the asset categories, the suggested actions and the suggested triggers.

While the example system in FIG. 1 has been described with specific components including the computing device 112, the managing service 111, embodiments are not limited to these components or system configurations and can be implemented with other system configuration employing fewer or additional components.

Figure 2:
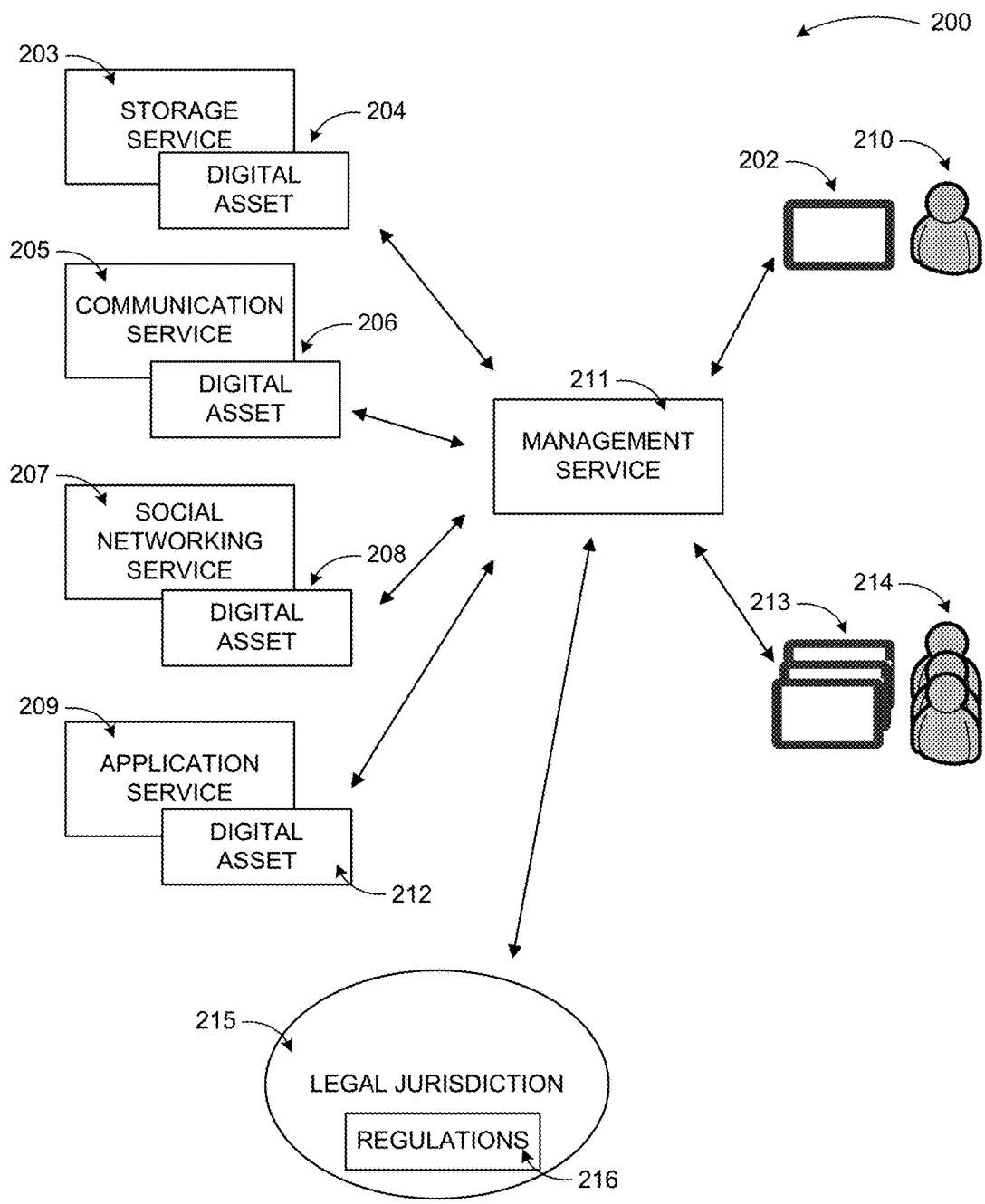
FIG. 2 illustrates an example of interactions between a management service and external resources to provide ongoing management for pre-planned handling of digital presence, according to embodiments.

FIG. 2 illustrates an example of interactions between a management service and external resources to provide ongoing management for pre-planned handling of digital presence, according to embodiments.

In a diagram 200, a management service 211 may interact with external resources and an asset manager 210, among others to provide ongoing management for pre-planned handling of digital presence. A workflow of digital assets, asset categories, suggested actions, and suggested trigger events may be updated based on a detected change of the digital assets. The workflow may be used to dispose of the digital assets of an asset owner(s) 214 in response to a trigger event such as an incapacitation of the asset owner(s) 214. The asset owner(s) 214 may include an individual as well as a group associated with an organization. An example of the asset owner(s) 214 may include an engineering group in a software company, among others.

The external resources may include a storage service 203, a communication service 205, a social networking service 207, and an application service 209. The storage service 203 may store a digital asset 204 such as a document of the asset owner(s) 214. The communication service 205 may provide communication related functionality such as an email service, a teleconference service, and a messaging service, among others. The communication service 205 may store a digital asset 206 such as an email of the asset owner(s) 214, among others.

The social networking service 207 may provide a digital asset 208 such as the social networking presence of the asset owner(s) 214. The digital asset 208 may include status and information related to the asset owner(s) 214 such as location and time based information associated with the asset owner(s) 214, and pictures of the asset owner 214, among others.

The application service 209 may provide a digital asset 212 such as an application used by the asset owner(s) 214. The application may be a hosted application such as a web application that is executed remotely and displayed by a client UI on a computing device(s) 213 of the asset owner(s) 214. Alternatively, the application may be a local application that may be downloaded to the computing device(s) 213 by the asset owner 214 for execution locally on the computing device(s) 213.

In an example scenario, the management service 211 may monitor digital assets (204, 206, 208, and 212) of the asset owner(s) 214 after an initial creation of a workflow that includes the digital assets (204, 206, 208, and 212), associated asset categories, suggested actions, and suggested triggers. The workflow may be initially created to dispose of the digital assets (204, 206, 208, and 212) in response to a trigger event of an incapacitation of the asset owner(s) 214.

The digital assets (204, 206, 208, and 212) may be monitored for changes. Upon a detection of a change, the change may be processed to update the workflow. The digital assets (204, 206, 208, and 212) may be reclassified to existing or other asset categories based on the change. The digital assets (204, 206, 208, and 212), the updated asset categories may be matched to new or existing suggested actions and trigger events. A notification of the digital assets (204, 206, 208, and 212), the updated asset categories, suggested action, and suggested trigger events may be transmitted to the asset manager 210 for a review. The notification may be transmitted to the asset manager 210 through a client UI of the management service 211 displayed on a computing device 202.

The asset manager 210 and the asset owner(s) 214 may be the same person. Alternatively, the asset manager 210 may include a legal representative of the asset owner 214, an authorized family member of the asset owner 214, an authorized relation of the asset owner 214, an authorized colleague of the asset owner 214, an authorized supervisor of the asset owner(s) 214, among others.

The management service 211 may retrieve the digital assets (204, 206, 208, and 212) from the associated services using the credentials provided by the asset owner(s) 214. The asset manager 210 may also be authorized to have access to the credentials of the asset owner(s) 214. The asset manager 210 may manage access to the digital assets (204, 206, 208, and 212) through the client UI of the management service 211 displayed on the computing device 202. The asset manager 210 may provide updated credentials to the management service 211 through the client UI displayed on the computing device 202 to allow the management service 211 continuously monitor the digital assets (204, 206, 208, and 212). The management service 211 may also query the asset manager 210 to prompt the asset manager 210 to provide updated credentials in case of a failure to access the digital assets (204, 206, 208, and 212).

In response to a detection of a change to the digital assets (204, 206, 208, and 212), the management service 211 may retrieve the change and reclassify the digital assets (204, 206, 208, and 212) to asset categories such as a document type, and an account association, among others. The digital assets, the updated asset categories may be matched to suggested actions and suggested trigger events to dispose of the digital assets. The suggested actions may include operations such as an action to forward the digital assets (204, 206, 208, and 212) to a legal representative of the asset owner 214, an action to transmit credentials to the services associated with the digital assets (204, 206, 208, and 212) to the legal representative, an action to delete the digital assets (204, 206, 208, and 212) in the associated service, and an action to delete accounts associated with the digital assets (204, 206, 208, and 212), among others.

The updated suggested actions may also be processed with regulations 216 retrieved from a legal jurisdiction 215 associated with the asset owner(s) 214 or the digital assets (204, 206, 208, and 212). The legal jurisdiction 215 may provide the regulations 216 to scrutinize the suggested actions for compliance. The regulations may include retention time periods that prevent an action to delete digital assets that belong to types such as documents, among others.

The management service 211 may also match the digital assets (204, 206, 208, and 212), the updated asset categories to suggested trigger events. The suggested trigger events may include an incapacitation of the asset owner(s) 214. The incapacitation may include an inactivity by the asset owner 214 during a period of time, a death of the asset owner 214, a disablement of the asset owner 214, an expatriation of the asset owner 214, a permanent relocation of the asset owner 214, an imprisonment of the asset owner 214, and a legal incapacitation declaration associated with the asset owner 214, among others. The trigger event may be detected by monitoring the digital assets (204, 206, 208, and 212) for an information associated with the incapacitation. Alternatively, the asset manager 210 may initiate the trigger event manually through a client UI of the management service 211.

Figure 3:
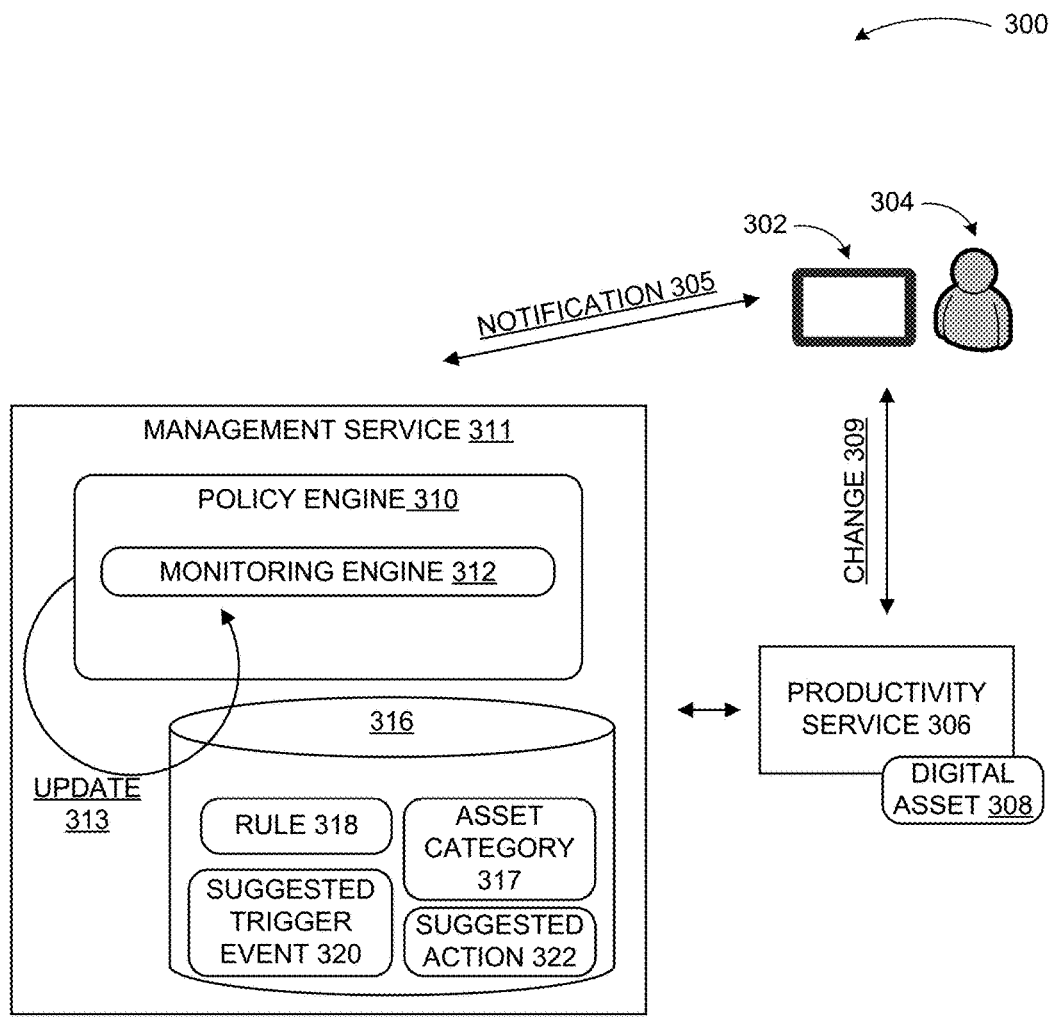
FIG. 3 illustrates a component diagram of a management service that provides ongoing management for pre-planned handling of digital presence, according to embodiments.

FIG. 3 illustrates a component diagram of a management service provides ongoing management for pre-planned handling of digital presence, according to embodiments.

In a diagram 300, a management service 311 may provide ongoing management for pre-planned handling of digital presence. An asset manager 304 may access a client UI of the management service 311 through a computing device 302. The asset manager 304 may provide the management service 311 with credentials to a productivity service 306. Using the credentials to gain access, the management service 311 may monitor a digital asset 308 hosted by the productivity service 306.

A workflow to dispose of the digital asset 308 may be created by the management service 311. In response to a change 309 to the digital asset 308, contents of the workflow may be reprocessed to update the contents with the change 309. A notification 305 may be transmitted to the client UI of the management service 311 displayed to the asset manager 304 on a computing device 302. The notification 305 may inform the asset manager 304 of the updates to the digital asset 308, an asset category 317, a suggested trigger event 320, and a suggested action 322 as a result of the change 309 to the digital asset 308.

The management service 311 may have a policy engine 310 that maintains the suggested action 322 with operations dispose of the digital asset 308. The policy engine 310 may include a rule 318 that describes an asset management policy associated with an organization of which the asset owner may be a member. In response to an identification of the asset owner as a member of a group of the organization, the change may be processed with the rule 318 to detect a compliance with the rule 318. In response to a detection the compliance, a verification of the compliance may be transmitted to the asset manager 304 with the notification 305. In response to a failure to detect the compliance, an alert may be transmitted with the notification 305 to the asset manager 304. The alert may inform the asset manager 304 of the failure to comply with the rule 318 of the organization.

The policy engine 310 may also process the change 309 to reclassify the digital asset 308 into an asset category 317. The asset category 317 may be a new asset category or a previously assigned asset category. An example of the asset category 317 may include a picture classification, a document classification, a music classification, a video classification, a purchased subscription classification, a social networking account association, and a professional networking account association, among others. Another example of the asset category 317 may include a time of creation, a location of creation, a creator of the digital asset 308, among others. Yet, another example of the asset category 317 may include a sharing relation associated with the digital asset 308. The sharing relation may include of a family member of the asset owner, a friend of the asset owner, a colleague of the asset owner, a group member associated with the asset owner.

The monitoring engine 312 may provide the change 309 to the policy engine 310 for reclassification of the digital asset 308 to the asset category 317. The digital asset 308 and the asset category 317 may be matched to the suggested action 322. The suggested action 322 may be executed to dispose of the digital asset 308 in response to a detection of the suggested trigger event 320. A data store 316 may store a list of rules, categories, trigger events, and actions that include the rule 318, the asset category 317, the suggested trigger event 320, and the suggested action 322, which may be used to generate the workflow to dispose of the digital asset 308.

The monitoring engine 312 may be a component of the policy engine 310. Alternatively, the monitoring engine 312 may be a stand-alone component of the management service 311. The policy engine 310 may initiate an update 313 in response to a detection by the monitoring engine 312 of a change 309 to the digital asset 308 at the productivity service 306.

In an example scenario, the monitoring engine 312 may periodically query the productivity service 306 to detect the change 309 to the digital asset 308. The digital asset 308 may also be monitored to detect information associated with the suggested trigger event 320. A death announcement of the asset owner within a content of the digital asset 308 may be identified as the suggested trigger event 320.

A modification to the digital asset 308 identified as the change 309 may be used to detect a new asset category that matches the modification. The digital asset 308 may be reclassified to a new asset category based on the change 309. Alternatively, an addition to the digital asset 308 may be identified as the change 309. The addition and the digital asset 308 may be reclassified into a new asset category or the asset category 317. Furthermore, a deletion of the digital asset 308 may be identified as the change 309. An association between the digital asset 308 and the asset category 317 may be removed. Suggested trigger event 320 and the suggested action 322 may be unassociated from the asset category 317 and the digital asset 308.

The change 309 may be detected in response to a creation of a new account or a deletion of an existing account at the productivity service 306. The new account may include the digital asset 308 that may be reclassified by the policy engine 310. The existing account (marked for deletion) may include the digital asset 308 that may be removed by the policy engine 310 from an association with the asset category 317, suggested trigger event 320 and the suggested action 322. Furthermore, the change 309 may be detected in response to a creation of a new account at a new external resources. The change 309 may be processed to update the contents of the workflow associated with a digital asset updated by the change 309 at the new external resource.

The change 309 may also be detected in response to a relocation of the digital asset 308. A relocation may be identified as a transfer of the digital asset 308 from the productivity service 306 to a new external resource. A relocation may also be identified as a transfer from the productivity service 306 to a local resource of a computing device used by the asset owner, or an authorized representative, among others.

Figure 4:
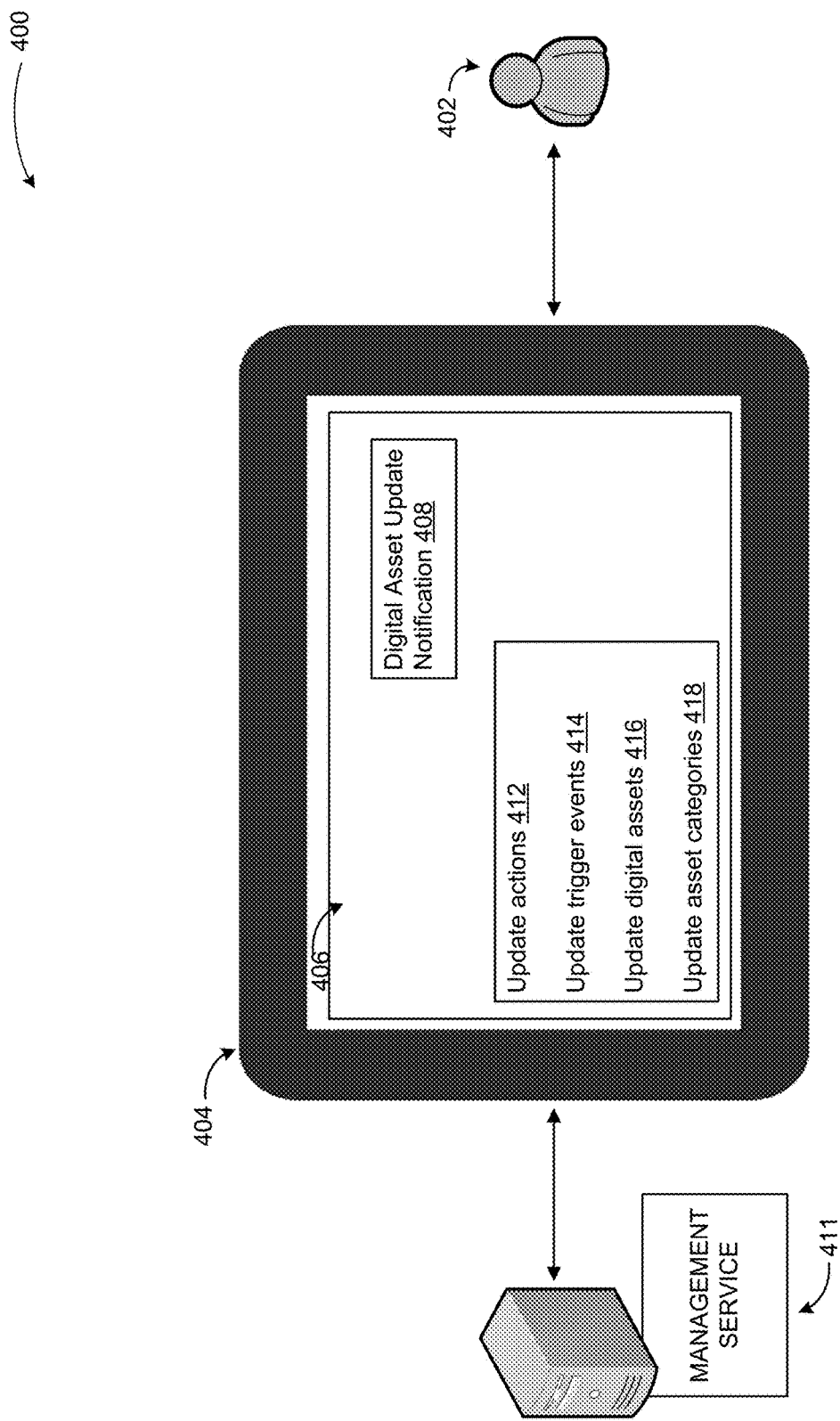
FIG. 4 illustrates an example of a user interface to provide ongoing management for pre-planned handling of digital presence, according to embodiments.

FIG. 4 illustrates an example of a user interface to provide ongoing management for pre-planned handling of digital presence, according to embodiments.

In a diagram 400, a management service 411 may provide a client UI 406 on a computing device 404 to allow an asset manager 402 to review and customize updates to a workflow that describes how to dispose of digital assets of an asset owner. The workflow may include components such as suggested actions that are processed based on the digital assets, asset categories associated with the digital assets, and suggested trigger events. The updates to the suggested actions, the asset categories, the digital assets, the suggested trigger events may be customized by the asset manager 402. The updates to the suggested actions may also be processed based on regulations of a legal jurisdiction associated with the asset owner or the digital assets to detect a compliance with the regulations.

The client UI 406 may display a notification 408 that may include display information about updates to the components of the workflow based on the detected change to the digital asset. The notification 408 may display an alert that may indicate a failure of the change to comply with a regulation of the jurisdiction associated with the digital asset or the asset owner. Alternatively, the alert may inform the asset manager of a failure of the change to comply with a rule of an organization. The asset owner may be a member of a group within the organization.

The notification 408 may also include a verification of a compliance of the change with the regulation of the jurisdiction associated with the digital asset or the asset owner. The notification 408 may also include a verification of a compliance of the change with a rule of the organization.

The client UI 406 may also display controls to allow the asset manager to review and modify updates to the components of the workflow. An "update actions" control 412 (upon activation) may provide additional controls to select and modify suggested actions that are updated in response to processing of the detected change. An example may include a list of suggested actions that match the updated digital asset such as a new version of a document. The list may include a delete action, a forward action, among others. The asset manager 402 may be provided with controls to select and modify the updated suggested actions from the list.

An "update trigger events" control 414 (upon activation) may provide additional controls to select and modify suggested trigger events that are updated in response to processing of the detected change. An example may include a list of updated suggested trigger events such as an incapacitation of the asset owner. The list may include a death of the asset owner, a disablement of the asset owner, an expatriation of the asset owner, a permanent relocation of the asset owner, an imprisonment of the asset owner, and a legal incapacitation declaration associated with the asset owner, among others. The asset manager 402 may be provided with controls to select and modify the updated trigger events from the list.

An "update digital assets" control 416 may provide the asset manager 402 with additional controls to modify a list of updated digital assets associated with the asset owner. The asset manager 402 may be provided with the additional controls to select a subset of the updated digital assets to monitor for disposition in case of a trigger event.

An "update asset categories" control 418 may provide the asset manager 402 with additional controls to modify a list of updated asset categories associated with the digital asset. The asset manager 402 may be provide with the additional controls to select a subset of the updated asset categories to associate with the updated digital assets.

According to embodiments described herein, the technical advantage of ongoing management for pre-planned handling of digital presence may include improved usability of digital assets with optimized actions generated to manage digital assets of an asset owner after an incapacitation event. A workflow of digital asset management actions to dispose of the digital assets may address a need that arises from extensive digital personalities generated by asset owners in an extensive digital world. The workflow of digital asset management actions may streamline disposition of the digital assets following the incapacitation event compared to cumbersome legacy manual asset review solutions.

Embodiments address a need that arises from very large scale of operations created by networked computing and cloud based services that cannot be managed by humans. The actions/operations described herein are not a mere use of a computer, but address results of a system that is a direct consequence of software used as a service such as digital asset management services offered in conjunction with digital asset owner incapacitation.

The example scenarios and schemas in FIG. 1 through 4 are shown with specific components, data types, and configurations. Embodiments are not limited to systems according to these example configurations. Ongoing management for pre-planned handling of digital presence may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
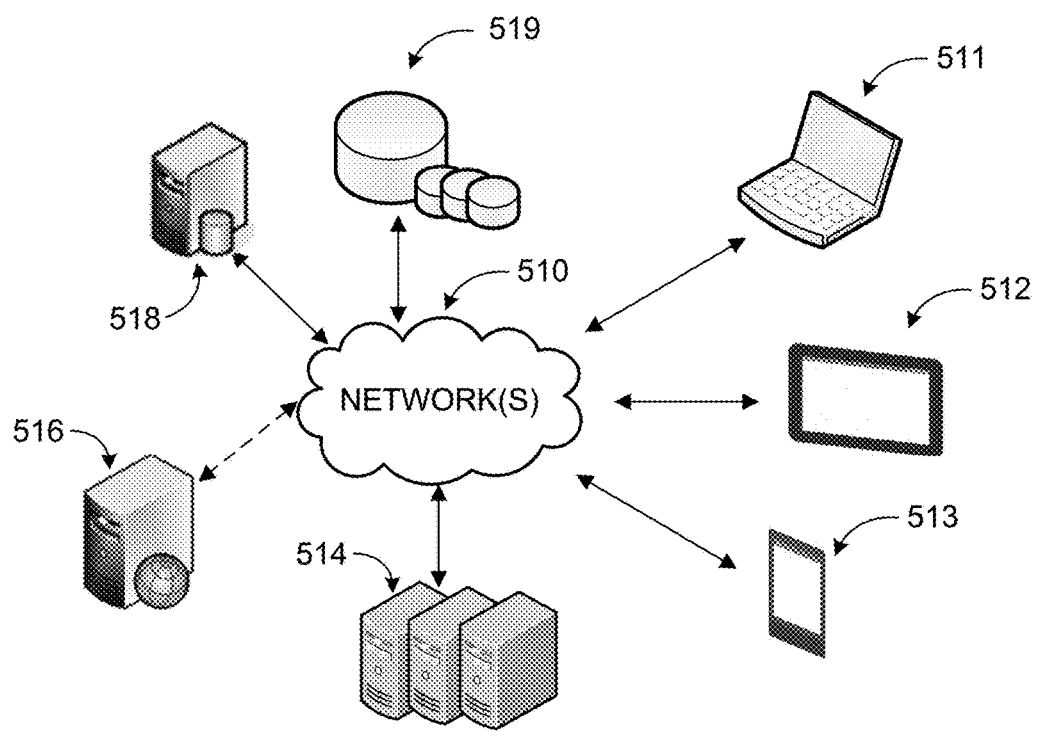
FIG. 5 is a simplified networked environment, where a system according to embodiments may be implemented.

FIG. 5 is an example networked environment, where embodiments may be implemented. A management service configured to provide ongoing management for pre-planned handling of digital presence may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A management service may monitor digital assets of an asset owner hosted at external resources. A change to the digital assets may be retrieved from the external resources in response to a detection of the change at the external resources. The change may be processed to reclassify the digital assets into asset categories which may be matched to (along with the digital assets) suggested actions and suggested trigger events. A notification may be transmitted to an asset manager to prompt the asset manager to review updates to the digital assets, the asset categories, the suggested actions, and the suggested trigger events. The management service may store data associated with digital assets in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide ongoing management for pre-planned handling of digital presence. Furthermore, the networked environments discussed in FIG. 5 are for illustration purposes only. Embodiments are not limited to the example applications, modules, or processes.

Figure 6:
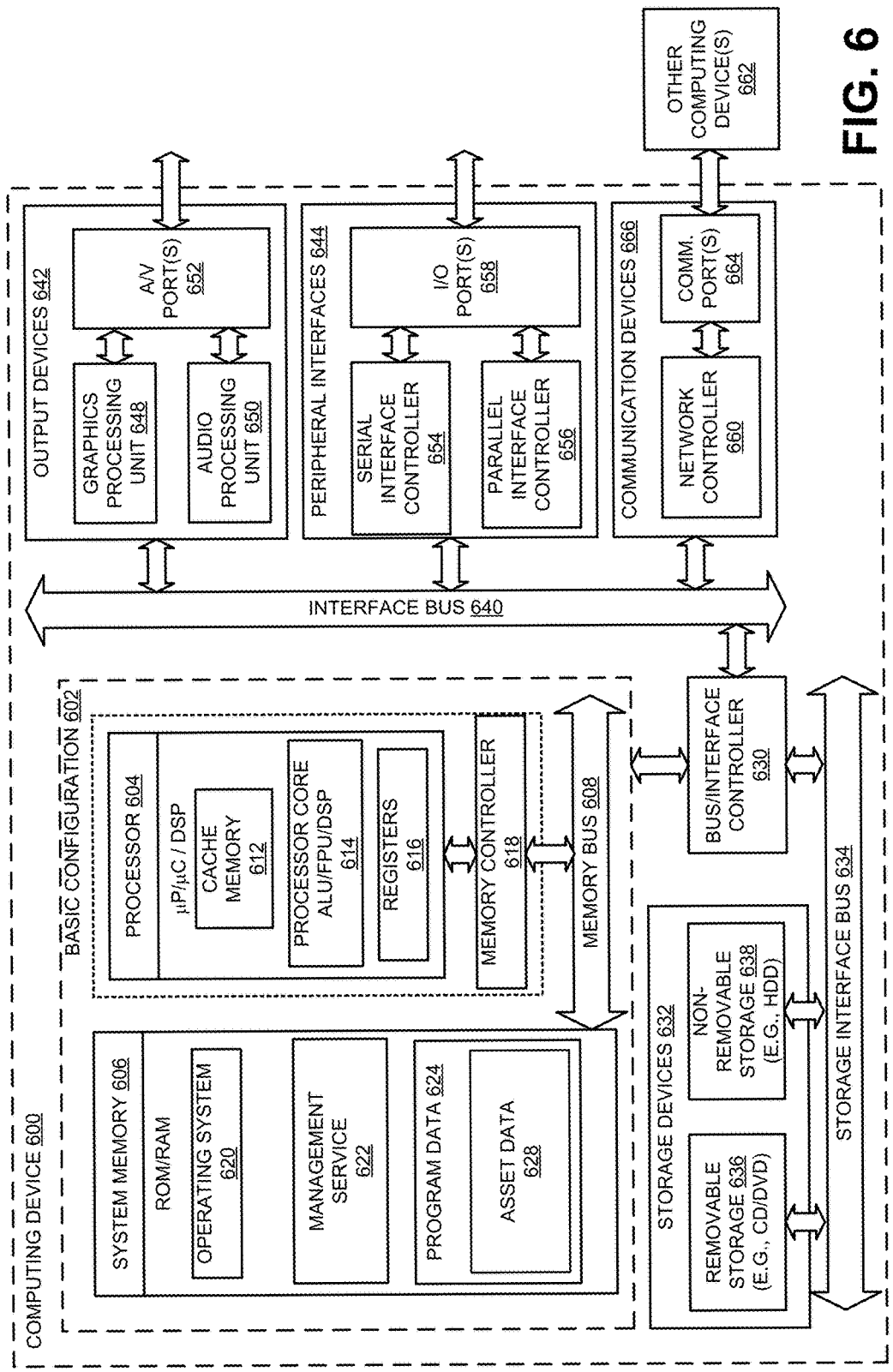
FIG. 6 illustrates a general purpose computing device, which may be configured to provide ongoing management for pre-planned handling of digital presence, according to embodiments.

FIG. 6 illustrates a general purpose computing device, which may be configured to provide ongoing management for pre-planned handling of digital presence, arranged in accordance with at least some embodiments described herein.

For example, the computing device 600 may be used to provide ongoing management for pre-planned handling of digital presence. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (μP), a microcontroller (μC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a management service 622, and a program data 624. The management service 622 may monitor digital assets of an asset owner hosted at external resources. A change to the digital assets may be retrieved from the external resources in response to a detection of the change at the external resources. The change may be processed to reclassify the digital assets into asset categories, which may be matched to (along with the digital assets), suggested actions and suggested trigger events. A notification may be transmitted to an asset manager to prompt the asset manager to review updates to the digital assets, the asset categories, the suggested actions, and the suggested trigger events. Components of the management service 622 (such as a client user interface) may also be displayed on a display device. An example of the display device may include another computing device with a display component. The display device may include a touch based device that detects gestures such as a touch action. The display device may also provide feedback in response to detected gestures (or any other form of input) by transforming a client user interface of the management service 622, displayed by the touch based device. The program data 624 may also include, among other data, asset data 628, or the like, as described herein. The asset data 628 may include a digital asset, an asset category, a suggested action, a suggested trigger event, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide ongoing management for pre-planned handling of digital presence. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
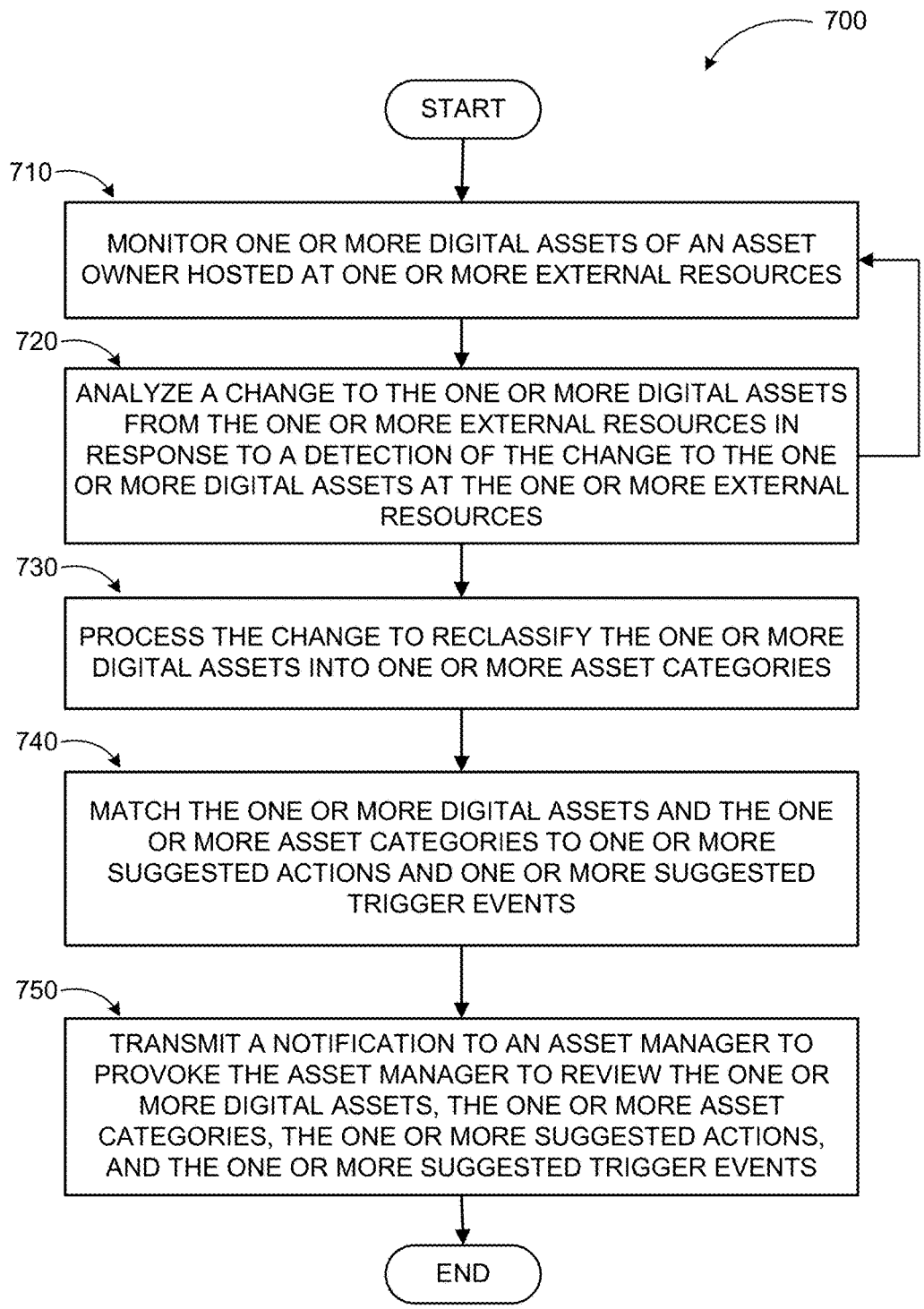
FIG. 7 illustrates a logic flow diagram for a process to provide ongoing management for pre-planned handling of digital presence, according to embodiments.

FIG. 7 illustrates a logic flow diagram for a process to provide ongoing management for pre-planned handling of digital presence, according to embodiments. Process 700 may be implemented on a management service.

Process 700 begins with operation 710, where digital assets of an asset owner hosted at external resources may be monitored by a management service. At operation 720, a change to the digital assets may be retrieved from the external resources in response to a detection of the change. The change may include an addition to, a modification, and a deletion of the digital assets. The change may be processed to reclassify the digital assets into asset categories at operation 730. The digital assets updated with the change may be reclassified to new asset categories or maintained in previously assigned asset categories, among others.

At operation 740, the digital asset and the asset categories may be matched to suggested actions and suggested trigger events. The suggested action may include operation to dispose of the digital assets. The trigger events may include an incapacitation of the asset owner. A notification maybe transmitted to an asset manager at operation 750 to prompt the asset manager to review updates to the digital assets, the asset categories, the suggested actions and the suggested trigger events.

Some or all of the operations of the process 700 may be reprocessed with feedback operations. In an example scenario, an identified change in the operation 720 may be used to predict related assets that may also be subject to a change. The related assets may be monitored for the predicted changes in the operation 710. Other feedback loops may be used with other operations of the process 700 to customize operations of the process 700, among other things.

The operations included in process 700 are for illustration purposes. A management service according to embodiments may be implemented by similar processes with fewer or additional steps, as well as in different order of operations using the principles described herein.

According to some examples, a computing device to provide ongoing management for pre-planned handling of digital presence. The computing device may include a memory configured to store instructions associated with a management service and one or more processors coupled to the memory. The one or more processors may execute the management service in conjunction with instructions stored in the memory. The management service may include a monitoring engine configured to monitor one or more digital assets of an asset owner hosted at one or more external resources. The management may further include a policy engine configured to analyze a change to the one or more digital assets retrieved from the one or more external resources in response to a detection of the change to the one or more digital assets at the one or more external resources, process the change to reclassify the one or more digital assets into one or more asset categories, match the one or more digital assets and the one or more asset categories to one or more suggested actions and one or more suggested trigger events, and transmit a notification to an asset manager to prompt the asset manager to review the one or more digital assets, the one or more asset categories, the one or more suggested actions, and the one or more suggested trigger events.

According to other examples, the policy engine may be further configured to identify the change as a modification of the one or more digital assets, detect a new asset category that matches the modification, and reclassify the one or more digital assets into the new asset category. The policy engine may be further configured to identify the change as an addition to the one or digital assets, match the addition to the one or more asset categories, and include the addition with the one or more digital assets. The policy engine may be further configured to identify the change as a deleted asset from the one or more digital assets, remove an association between the deleted asset and the one or more asset categories, and remove the deleted asset from the one or more digital assets.

According to further examples, the policy engine may be further configured to detect the change in response to one or more of: a creation of a new account and a deletion of an existing account at the one or more external resources. The change may be detected in response to a relocation of the one or more digital assets, where the relocation includes one or more of: a first transfer of the one or more digital assets from an existing external resource to a new external resource, and a second transfer of the one or more digital assets from the existing external resource to a local resource. The change may be detected in response to a creation of a new account at a new external resource.

According to other examples, the policy engine may be further configured to identify the asset owner as a member of a group within an organization and the asset manager as a supervisor of the group and process the change with rules of the organization to detect a compliance with the rules. The policy engine may be further configured to in response to a failure to detect the compliance with the rules of the organization, include an alert within the notification transmitted to the asset manager, where the alert informs the asset manager of the failure to comply with the rules of the organization. The policy engine may be further configured to in response to a detection of the compliance with the rules of the organization, include a verification of the compliance with the rules of the organization within the notification transmitted to the asset manager. The policy engine may be further configured to detect a failure to access the one or more digital assets within a time period and include an alert within the notification transmitted to the asset manager, where the alert informs the asset manager of the failure the access the one or more digital assets.

According to some examples, a method executed on a computing device to provide ongoing management for pre-planned handling of digital presence may be provided. The method may include monitoring one or more digital assets of an asset owner hosted at one or more external resources, analyzing a change to the one or more digital assets retrieved from the one or more external resources in response to a detection of the change to the one or more digital assets at the one or more external resources, processing the change to reclassify the one or more digital assets into one or more asset categories, matching the one or more digital assets and the one or more asset categories to one or more suggested actions and one or more suggested trigger events, and transmitting a notification to an asset manager to prompt the asset manager to review the one or more digital assets, the one or more asset categories, the one or more suggested actions, and the one or more suggested trigger events, where the asset manager includes one or more of the asset owner, a legal representative of the asset owner, an authorized family member of the asset owner, an authorized relation of the asset owner, an authorized colleague of the asset owner, and an authorized supervisor of the asset owner.

According to other examples, the method may further include accessing a legal resource to retrieve regulations of a jurisdiction associated with one or more of the asset owner and the one or more digital assets and processing the change to detect a compliance with the regulations. The method may further include in response to a failure to detect the compliance with the regulations, including an alert within the notification transmitted to the asset manager, where the alert informs the asset manager of the failure to comply with the regulations. The method may further include in response to a detection of the compliance, including a verification of the compliance with the regulations within the notification transmitted to the asset manager. The method may further include periodically accessing a legal resource to retrieve updates to regulations of a jurisdiction associated with one or more of the asset owner and the one or more digital assets, processing the one or more digital assets and the one or more suggested actions with the updates to the regulations of the jurisdiction to detect a compliance with the updates to the regulations, and including an alert in the notification, where the alert includes a statement describing the compliance of the one or more digital assets and the one or more suggested actions with the updates to the regulations.

According to some examples, a computer-readable memory device with instructions stored thereon to provide ongoing management for pre-planned handling of digital presence may be described. The instructions may include actions that are similar to the method described above.

According to some examples, a means to provide ongoing management for pre-planned handling of digital presence may be described. The means to provide ongoing management for pre-planned handling of digital presence may include a means to monitor one or more digital assets of an asset owner hosted at one or more external resources, a means to analyze a change to the one or more digital assets retrieved from the one or more external resources in response to a detection of the change to the one or more digital assets at the one or more external resources, a means to process the change to reclassify the one or more digital assets into one or more asset categories, a means to match the one or more digital assets and the one or more asset categories to one or more suggested actions and one or more suggested trigger events, and a means to transmit a notification to an asset manager to prompt the asset manager to review the one or more digital assets, the one or more asset categories, the one or more suggested actions, and the one or more suggested trigger events.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide ongoing management for pre-planned handling of digital presence, the computing device comprising:
    a memory configured to store instructions associated with a management service;
    one or more processors coupled to the memory, the one or more processors executing the management service in conjunction with the instructions stored in the memory, wherein the one or more processors are configured to:
        generate and execute a workflow to perform one or more actions associated with a digital asset of an asset owner in response to detection of a trigger event defined by the asset owner, wherein the workflow includes monitoring the digital asset of the asset owner hosted at an external resource;
        detect a change to the digital asset at the external resource;
        process the change to reclassify the digital asset into a new or existing asset category;
        match the digital asset and the new or existing asset category to one or more suggested actions and a new or existing trigger event;
        update the workflow based on the match to the one or more suggested actions and the new or existing trigger event; and
        transmit a notification to an asset manager to prompt the asset manager to review the digital asset, the new or existing asset category, the one or more suggested actions, and the new or existing trigger event.

2. The computing device of claim 1, wherein the one or more processors are further configured to:
    identify the change as a modification of the digital asset;
    detect a new asset category that matches the modification; and
    reclassify the digital asset into the new asset category.

3. The computing device of claim 1, wherein the one or more processors are further configured to:
    identify the change as an addition to the digital asset;
    match the addition to the new or existing asset category; and
    include the addition with the digital asset.

4. The computing device of claim 1, wherein the one or more processors are further configured to:
    identify the change as a deleted asset from the digital asset;
    remove an association between the deleted asset and the new or existing asset category; and
    remove the deleted asset from the digital asset.

5. The computing device of claim 1, wherein the one or more processors are further configured to:
    detect the change in response to one or more of: a creation of a new account and a deletion of an existing account at the external resource.

6. The computing device of claim 1, wherein the one or more processors are further configured to:
    detect the change in response to a relocation of the digital asset, wherein the relocation includes one or more of: a first transfer of the digital asset from an existing external resource to a new external resource, and a second transfer of the digital asset from the existing external resource to a local resource.

7. The computing device of claim 1, wherein the one or more processors are further configured to:

detect the change in response to a creation of a new account at a new external resource.

8. The computing device of claim 1, wherein the one or more processors are further configured to:
   identify the asset owner as a member of a group within an organization and the asset manager as a supervisor of the group; and
   process the change with rules of the organization to detect a compliance with the rules.

9. The computing device of claim 8, wherein the one or more processors are further configured to:
   in response to a failure to detect the compliance with the rules of the organization, include an alert within the notification transmitted to the asset manager, wherein the alert informs the asset manager of the failure to comply with the rules of the organization.

10. The computing device of claim 8, wherein the one or more processors are further configured to:
    in response to a detection of the compliance with the rules of the organization, include a verification of the compliance with the rules of the organization within the notification transmitted to the asset manager.

11. The computing device of claim 1, wherein the one or more processors are further configured to:
    detect a failure to access the digital asset within a time period; and
    include an alert within the notification transmitted to the asset manager, wherein the alert informs the asset manager of the failure the access the digital asset.

12. A method executed on a computing device to provide ongoing management for pre-planned handling of digital presence, the method comprising:
    generating and executing a workflow to perform one or more actions associated with a digital asset of an asset owner in response to detecting a trigger event defined by the asset owner, wherein the workflow includes monitoring the digital asset of the asset owner hosted at an external resource;
    detecting a change to the digital asset at the external resource;
    processing the change to reclassify the digital asset into a new or existing asset category;
    matching the digital asset and the new or existing asset category to one or more suggested actions and a new or existing trigger event;
    updating the workflow based on the matching to the one or more suggested actions and the new or existing trigger event; and
    transmitting a notification to an asset manager to prompt the asset manager to review the digital asset, the new or existing asset category, the one or more suggested actions, and the new or existing trigger event.

13. The method of claim 12, further comprising:
    accessing a legal resource to retrieve regulations of a jurisdiction associated the asset owner and the digital asset; and
    processing the change to detect a compliance with the regulations.

14. The method of claim 13, further comprising:
    in response to a failure to detect the compliance with the regulations, including an alert within the notification transmitted to the asset manager, wherein the alert informs the asset manager of the failure to comply with the regulations.

15. The method of claim 13, further comprising:
    in response to a detection of the compliance, including a verification of the compliance with the regulations within the notification transmitted to the asset manager.

16. The method of claim 12, further comprising:
    periodically accessing a legal resource to retrieve updates to regulations of a jurisdiction associated with the asset owner and the digital asset; and
    processing the digital asset and the one or more suggested actions with the updates to the regulations of the jurisdiction to detect a compliance with the updates to the regulations.

17. The method of claim 16, further comprising:
    including an alert in the notification, wherein the alert includes a statement describing the compliance of the digital asset and the one or more suggested actions with the updates to the regulations.

18. A computer-readable memory device with instructions stored thereon to provide ongoing management for pre-planned handling of digital presence, the instructions comprising:
    generating and executing a workflow to perform one or more actions associated with a digital asset of and asset owner in response to detecting a trigger event defined by the asset owner, wherein the workflow includes monitoring the digital asset of the asset owner hosted at an external resource;
    detecting a change to the digital asset at the external resource;
    processing the change to reclassify the digital asset into a new or existing asset category;
    matching digital asset and the new or existing asset category to one or more suggested actions and a new or existing trigger event;
    updating the workflow based on the matching to the one or more suggested actions and the new or existing trigger event; and
    transmitting a notification to an asset manager to prompt the asset manager to review the digital asset, the new or existing asset category, the one or more suggested actions, and the new or existing trigger event.

19. The computer-readable memory device of claim 18, wherein the instructions further comprise:
    identifying the asset owner as a member of a group within an organization and the asset manager as a supervisor of the group;
    processing the change with rules of the organization to detect a compliance with the rules; and
    in response to a failure to detect the compliance with the rules of the organization, including an alert within the notification transmitted to the supervisor, wherein the alert informs the supervisor of the failure to comply with the rules of the organization.

20. The computer-readable memory device of claim 18, wherein the instructions further comprise:
    periodically accessing a legal resource to retrieve updates to regulations of a jurisdiction associated with the asset owner and the digital asset;
    processing the digital asset and the one or more suggested actions with the updates to the regulations of the jurisdiction to detect a compliance with the updates to the regulations; and
    including an alert in the notification, wherein the alert includes a statement describing the compliance of the digital asset and the one or more suggested actions with the updates to the regulations.

* * * * *